(12) United States Patent
Menasce et al.

(10) Patent No.: US 7,350,012 B2
(45) Date of Patent: Mar. 25, 2008

(54) METHOD AND SYSTEM FOR PROVIDING FAULT TOLERANCE IN A NETWORK

(75) Inventors: Victor Menasce, Kanata (CA); Stephane Gagnon, Kanata (CA)

(73) Assignee: Tundra Semiconductor Corporation, Kanata, Ontario (CA)

( * ) Notice: Subject to any disclaimer, the term of this patent is extended or adjusted under 35 U.S.C. 154(b) by 882 days.

(21) Appl. No.: 10/615,142

(22) Filed: Jul. 9, 2003

(65) Prior Publication Data

US 2004/0059957 A1 Mar. 25, 2004

Related U.S. Application Data

(60) Provisional application No. 60/395,129, filed on Jul. 12, 2002.

(51) Int. Cl.
*G06F 13/14* (2006.01)
*G06F 11/00* (2006.01)
*H04L 12/50* (2006.01)
*H04Q 11/00* (2006.01)

(52) U.S. Cl. .................... 710/305; 714/1; 370/359
(58) Field of Classification Search ............ 370/359; 714/41, 56; 710/305, 300, 316
See application file for complete search history.

(56) References Cited

U.S. PATENT DOCUMENTS

| | | | | |
|---|---|---|---|---|
| 5,862,403 A | * | 1/1999 | Kanai et al. ................ 710/6 |
| 5,925,120 A | * | 7/1999 | Arp et al. ................ 710/314 |
| 6,038,288 A | * | 3/2000 | Thomas et al. .......... 379/15.01 |
| 6,052,795 A | * | 4/2000 | Murotani et al. .............. 714/3 |
| 6,195,351 B1 | * | 2/2001 | Hiscock et al. ............ 370/389 |
| 6,295,575 B1 | * | 9/2001 | Blumenau et al. ............ 711/5 |
| 6,343,067 B1 | * | 1/2002 | Drottar et al. ............. 370/231 |
| 6,661,786 B1 | * | 12/2003 | Abbiate et al. ............ 370/386 |
| 6,674,971 B1 | * | 1/2004 | Boggess et al. ........... 370/139 |
| 6,691,185 B2 | * | 2/2004 | Avery ......................... 710/52 |
| 6,865,157 B1 | * | 3/2005 | Scott et al. ................ 370/242 |
| 6,895,528 B2 | * | 5/2005 | Cantwell et al. ............. 714/12 |
| 7,062,591 B2 | * | 6/2006 | Pecone ...................... 710/308 |
| 2002/0071386 A1 | * | 6/2002 | Gronke ...................... 370/217 |
| 2002/0080723 A1 | * | 6/2002 | Hoch et al. ................. 370/248 |
| 2002/0191547 A1 | * | 12/2002 | Akyol et al. ............... 370/252 |
| 2003/0090997 A1 | * | 5/2003 | Lindstrom ................. 370/228 |
| 2003/0204770 A1 | * | 10/2003 | Bergsten ....................... 714/5 |
| 2003/0236920 A1 | * | 12/2003 | Harris et al. ............... 709/253 |
| 2004/0168008 A1 | * | 8/2004 | Benson et al. ............. 710/306 |

* cited by examiner

*Primary Examiner*—Rafael Perez-Gutierrez
*Assistant Examiner*—Allahyar Kasraian (57) ABSTRACT

A configurable switching fabric port is disclosed having, in a particular configuration. A first interface that employs port interface resources and leaves at least one interface resource dormant and a second interface utilizing the dormant resource. One particular fault non-tolerant architecture, the RapidIO System, is specifically addressed. One implementation of this system incorporates transmission and reception ports configurable as 16 and 8 bit interfaces. In the 8-bit configuration, an 8-bit interface incorporates the least significant 8-bits of signal resources. Further, in the reduced, or 8-bit configuration, the most significant port interface resources of the 16 bit port are surplus.

12 Claims, 8 Drawing Sheets

METHOD AND SYSTEM FOR PROVIDING FAULT TOLERANCE IN A NETWORK

FIELD OF THE INVENTION

The present invention relates to fault tolerance, and more particularly to fault tolerance in data networks using a point to point, packet switched, fabric architecture.

BACKGROUND OF THE INVENTION

It is the nature of the computer system industry to require an exponential performance advantage over the generations while maintaining or decreasing system costs. In particular, telecommunications and networking systems benefit from a reduction in system size and an increase in capabilities.

Therefore, a point to point, packet switched, fabric architecture is displacing traditional memory mapped bus architecture for use in network equipment, storage subsystems and computing platforms capable of providing an interface for processors, memory modules and memory mapped I/O devices.

Modern digital data networks are increasingly employing such point to point, packet switched, fabric interconnect architectures to overcome bandwidth limitations. These networks transmit encapsulated address, control and data packets from the source ports across a series of routing switches or gateways to addressed destinations. The switches and gateways of the switching fabric are capable of determining from the address and control contents of a packet, what activities must be performed.

Incorporating a level of fault tolerance in a packet switched network is highly desirable. Fault tolerance is the ability of a system to respond gracefully to an unexpected component failure. Traditionally, fault-tolerance has referred to building subsystems from redundant components that are placed in parallel; Faults are determined above the physical level of the protocol based on communication failure; such information is relayed to the physical layer, which can employ redundancy. Failure to account for faults will render at least that port inoperative, which may result in larger scale, possibly system wide failure, depending on the nature of the component corresponding to the port.

There are a number of architectures for proving fault tolerance. These architectures can be grouped into cold, warm and hot standby, or load shared. Cold stand-by refers to equipment that can be started once the first unit fails. Dead time will occur while the replacement unit is started, switched into place, and lost data is retransmitted. Warm stand-by refers to equipment that is always running pending failure of the first unit. A shorter dead time will occur while the second unit is switched into the first unit's place, and lost data is retransmitted. Hot stand-by refers to equipment that is always running, and is always hooked up ready to take over if the first unit fails. Hot standby equipment does not actually carry any traffic until the first unit fails, but no dead time interrupts communications when the first unit fails. Load Shared refers to equipment that is always running, and is always hooked up transmitting data in combination with the primary unit.

In order to ensure compatibility, fabric architectures must adhere to standards. Introduction of additional features in standard compliant systems requires the implementation of such features to be adapted to standard requirements of the existing architecture.

It is, therefore, necessary in implementing the point-to-point, packet-switched architecture described above, to consider the level of fault tolerance mandated for the system to which it is directed. Where fault tolerance is required, but not provided for by a standard, the system must have a method and/or an apparatus to overcome failure.

In the instance of switching fabrics, should an individual interface fail to communicate with the fabric, it is desirable for the interface to redundantly connect to an alternate fabric. However, a redundant interface dedicated to an alternate fabric would require a full complement of interface resources to implement. This failure could occur in the port, the fabric, or on the printed circuit board connecting the two.

It is often the case that configuration circumstances leave resources dormant in particular configurations.

In one standard, RapidIO System, a physical specification is defined (RapidIO Interconnect Specification Part IV: Physical Layer 8/16 LP-LVDS Specification) with the flexibility to support dedicated 8 or 16 bit interfaces. Where a RapidIO port has been designed to be configurably connectable to either standard bus, but is only using the 8 bit configuration, some signal resources are left idle. The RapidIO standard is compatible with cold and hot standby and provides for guaranteed message delivery.

In another standard, HyperTransport™ I/O Link Specification (Revision 1.03), a protocol is defined with the flexibility to support dedicated 2, 4, 8, 16 or 32 bit interfaces. Utilized width is accomplished by negotiating a link compatible with the smallest end. As in the case of RapidIO, some signal resources are left idle in non-32 bit configurations. The HyperTransport™ standard is compatible with cold standby and does not provide for guaranteed message delivery.

What is needed is a fault tolerant adaptation of existing architectures that minimizes additional resources required to support redundancy.

SUMMARY OF THE INVENTION

It is an advantage of the disclosed invention to adapt dormant resources of an existing fault non-tolerant architecture in order to provide for a fault tolerance mode (whether it be cold or hot stand by).

In a corresponding embodiment a configurable switching fabric port is disclosed having, in a particular configuration:

A first interface that employs port interface resources and leaves at least one interface resource dormant.

And a second interface utilizing the dormant resource.

One particular fault non-tolerant architecture, the RapidIO System, is specifically addressed. One implementation of this system incorporates transmission and reception ports configurable as 16 and 8 bit interfaces.

In the 8-bit configuration, an 8-bit interface incorporates the least significant 8-bits of signal resources. Further, in the reduced, or 8-bit configuration, the most significant port interface resources of the 16 bit port are surplus.

It is an advantage of the disclosed invention to adapt these surplus resources in order to provide for a redundant interface.

A second fault non-tolerant architecture, HyperTransport™ is also addressed. The HyperTransport™ standard supports interfaces that are configurable to 2, 4, 8, 16, or 32 bits in width. Wider links connected to narrower links negotiate to the least common width. In this case also, port resources on the wider link are left surplus, and available for enhancing system fault tolerance.

In corresponding embodiments of the invention, a second interface is provided incorporating those surplus most significant byte resources.

BRIEF DESCRIPTION OF DRAWINGS

The present invention will be further understood from the following detailed description with reference to the drawings in which.

DETAILED DESCRIPTION

Figure 1:
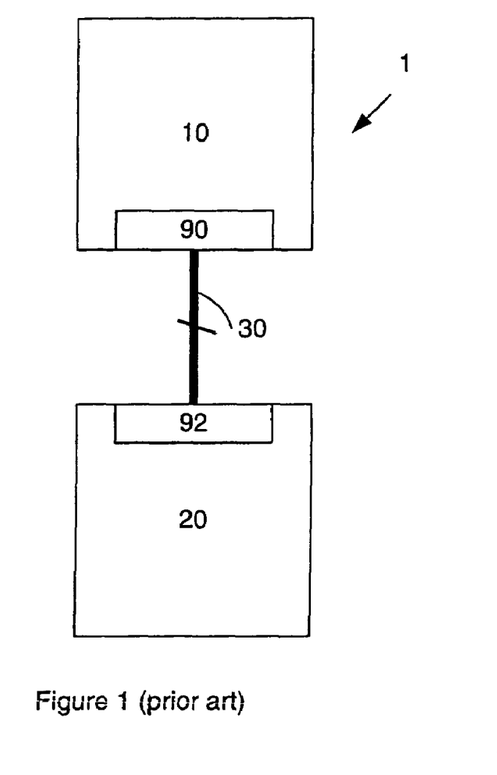
FIG. 1 is a schematic of an 8 bit RapidIO Network.
Figure 2:
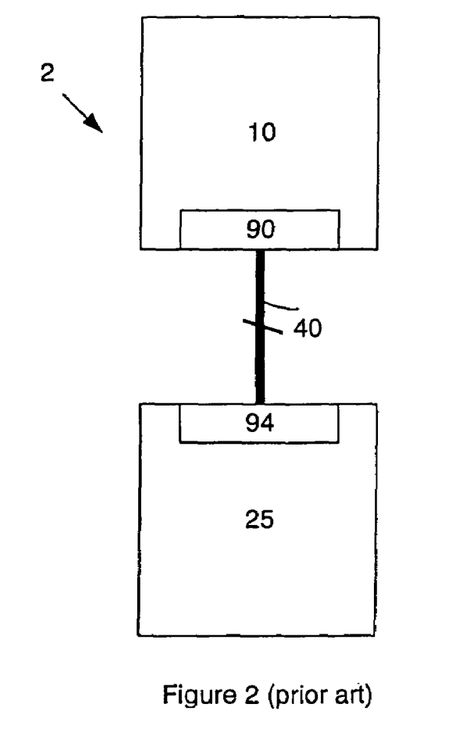
FIG. 2 is a schematic of a 16 bit RapidIO Network.
Figure 3:
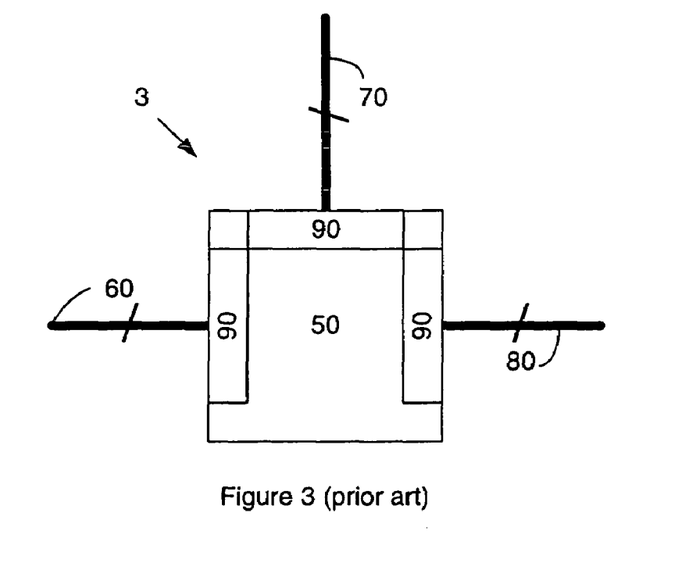
FIG. 3 is a partial schematic of a RapidIO Network with 8 and 16 bit portions.

Existing topologies provide for configuration of ports to adapt to multiple bus widths: FIG. 1 shows a network 1 with a device 10 and a device 20, both of which are connected by an 8 bit RapidIO Bus 30. FIG. 2 shows a network 2 with the same device 10 and another device 25, both of which are connected by a 16 bit RapidIO Bus 40. FIG. 3 shows a portion of a network 3 comprising a switch 50 connectable to two 8 bit busses 60, 70 and a 16 bit bus 80.

The devices require RapidIO physical ports in order to connect to their busses. Device 10 requires a configurable port 90 in order to provide for connection with either bus 30 or 40. It is commercial advantageous to produce a port with such flexibility. Device 20 employs a dedicated 8 bit port 92 and device 25 employs a dedicated 16 bit port 94. Device 50 employs 3 configurable ports 90. Since device 50 employs the configurable ports 90, it can bridge a variety of three bus situations. Knowledge of the art will suggest any number of variations of combinations of these 3 types of ports.

Figure 4:
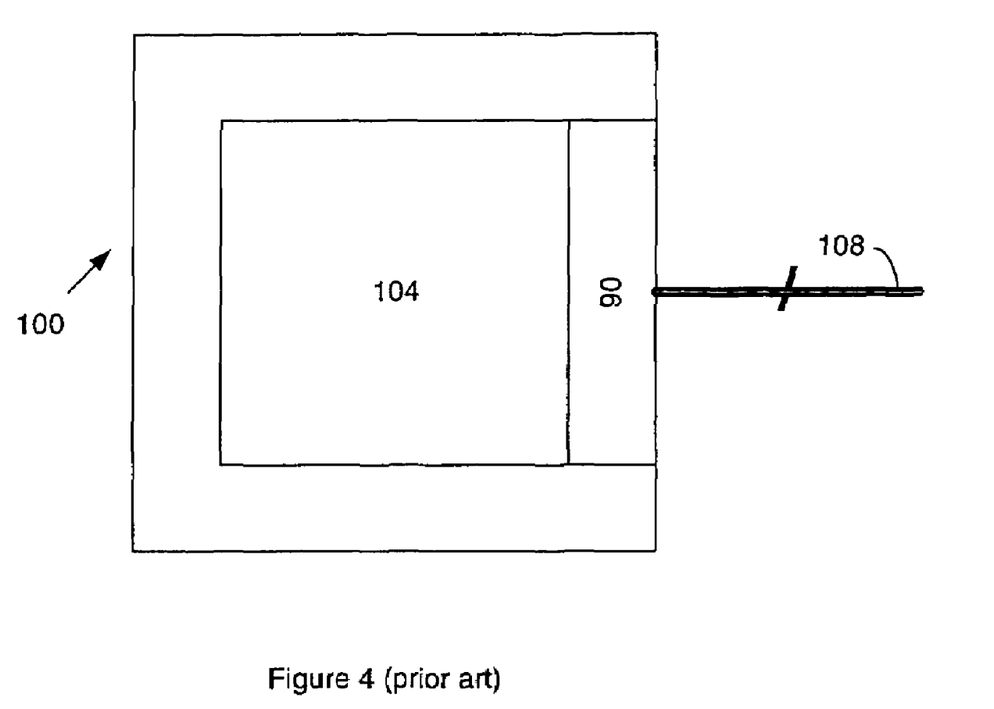
FIG. 4 is a schematic of a RapidIO device capable of communication over an 8 bit bus or a 16 bit bus.

In FIG. 4 we show greater detail of a device 100 capable of utilization in multiple configurations: Device 100 is connected to a RapidIO network. The device 100 is connected to the network by a bus 108. The port 90 is of the configurable type; bus 108 may be 8 or 16 bit. The port connects immediately with a device core 104; the core 104 comprises any RapidIO physical layer functions not comprised by port 90 as well as the functions of the transport layer and higher levels.

Figure 5:
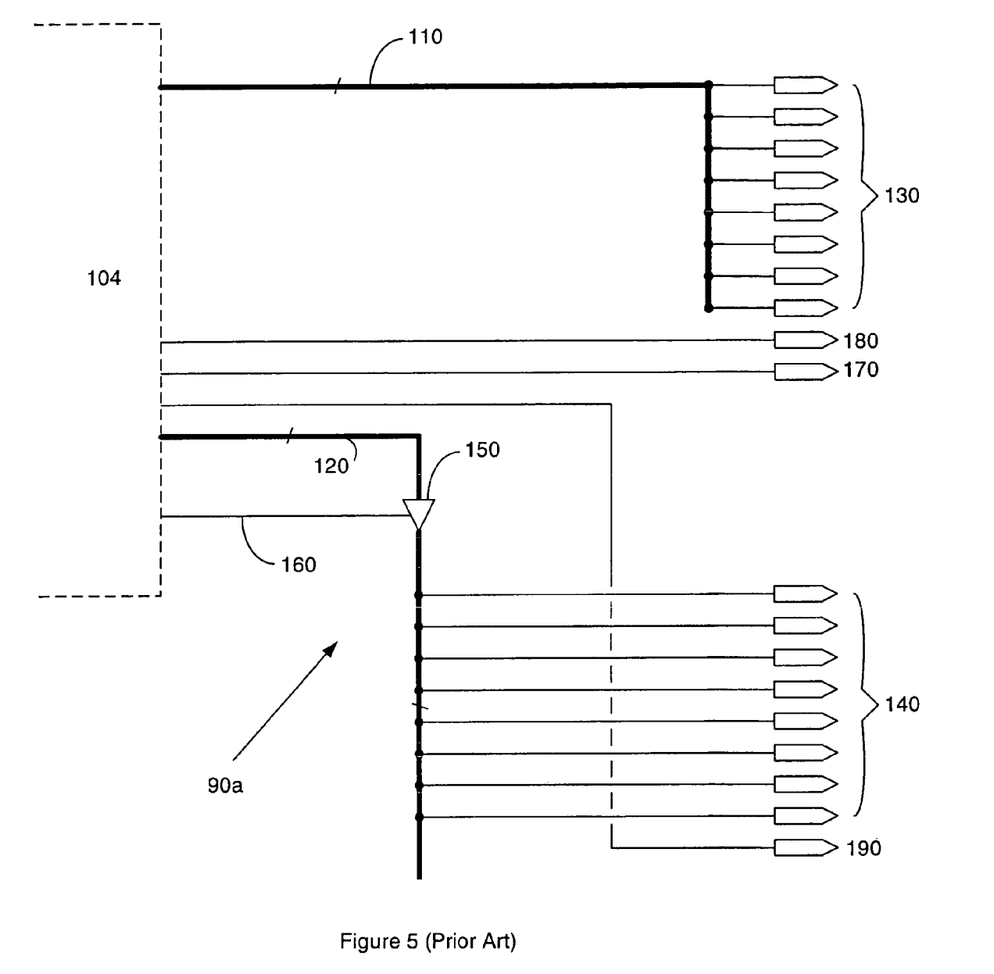
FIG. 5 is a schematic in detail of a transmission port capable of communication over 8 or 16 bit busses.
Figure 6:
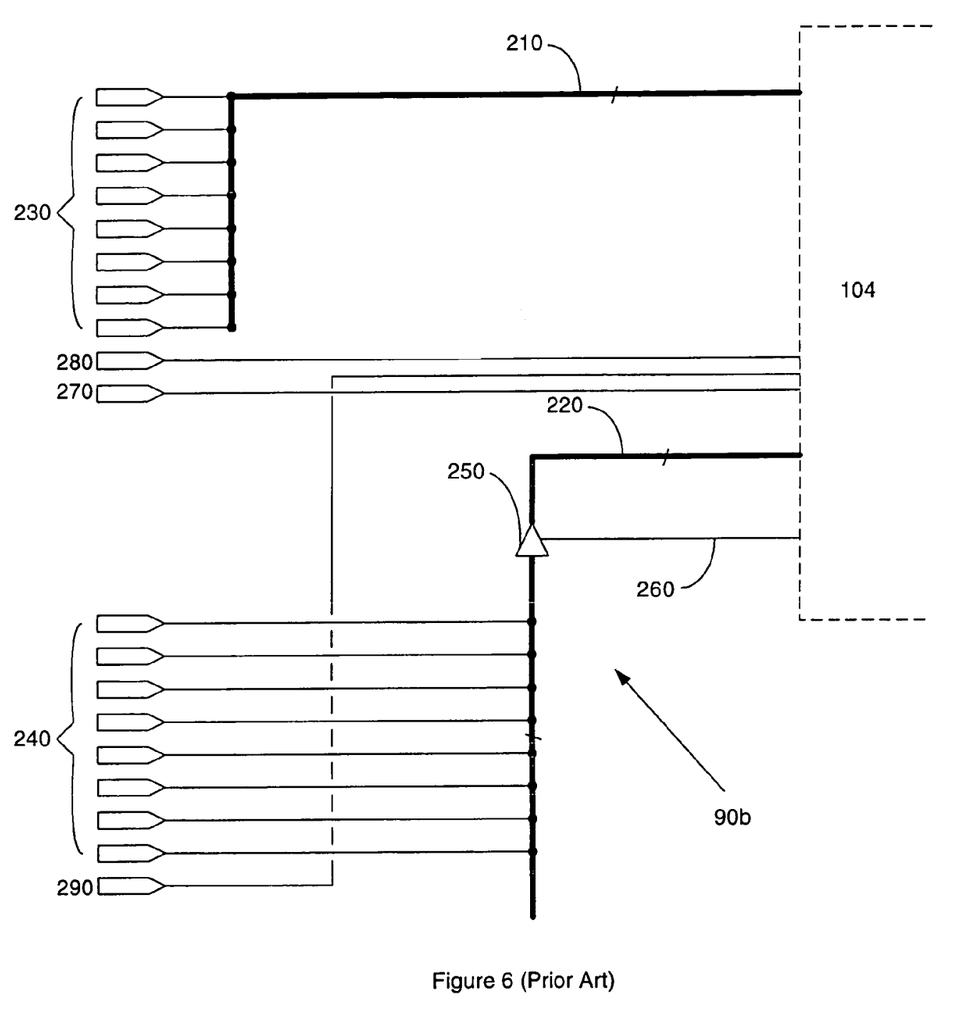
FIG. 6 is a schematic in detail of a reception port capable of communication over 8 or 16 bit busses.

FIGS. 5 and 6 detail the port 90 and it's immediate circumstances. Taking the half-ports 90a and 90b of FIGS. 5 and 6 together, we have the complete port 90.

FIG. 5 shows greater detail of a portion of the device 100 consisting of a transmission portion 90a of a known RapidIO transmission port 90 and the core 104. Connected to the core 104 are two 8-bit busses 110 and 120. Bus 110 is directly connected to a least significant byte (LSB)/8 bit output port 130.

Bus 120 is coupled to a most significant byte (MSB) port 140 by a buffer 150, in turn coupled to the core 104 by a 16 bit mode enable signal path 160. Coupled directly from the core is a frame signal path 170, and 2 clock signal paths 180, 190. Note that under the standard, there are two output ports for the clock signal, and each signal line is a low voltage differential pair.

Bus 110 asserts a least significant portion of a 16 bit datum or the entirety of an 8 bit datum. Bus 120 asserts a most significant portion of a 16 bit datum. The frame signal exists to communicate the intervals of 32 bit datum corresponding to groups of 8 or 16 bit transmissions. The core controls the configuration of the half-port 90a via the 16 bit mode enable signal path 160.

FIG. 6 shows greater detail of a portion of the device 100 consisting of a reception portion 90b of a known RapidIO transmission port 90 and the core 104. Connected to the core 104 are two 8-bit busses 210 and 220. Bus 210 is directly connected to a LSB/8 bit input port 230. Bus 220 is coupled to a MSB port 240 by a buffer 250, in turn coupled to the core 104 by a 16 bit mode enable signal path 260. Coupled directly from the core 104 is a frame signal 270 and 2 clock signals 280, 290. Note that under the standard, there are two input ports for the clock signal, and each signal line is a low voltage differential pair.

Bus 210 inputs the least significant portion of a 16 bit datum or the entirety of an 8 bit datum. Bus 220 inputs a most significant portion of a 16 bit datum. The frame signal exists to communicate the intervals of 32 bit datum corresponding to groups of 8 or 16 bit transmissions. The core controls the configuration of the half-port 90b via the 16 bit mode enable signal path 260.

Taken together, port 90a and 90b form the complete port 90. This ports is configurable via signals 160 and 260 as an 8 bit interface (bus 110 for transmission/bus 210 for reception) or a 16 bit interface (bus 110 plus 120 for transmission/bus 210 plus 220 for reception).

Figure 7A:
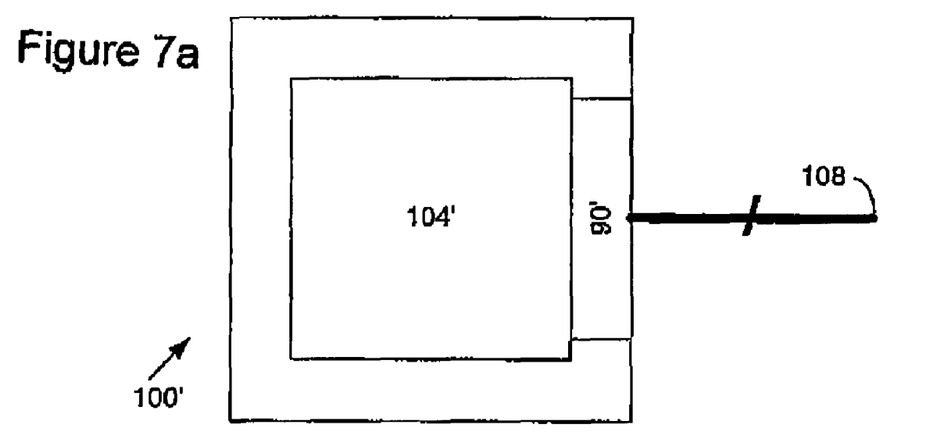
FIG. 7 is a schematic of a RapidIO device capable of communication over one or two 8 bit busses or one 16 bit bus.
Figure 7B:
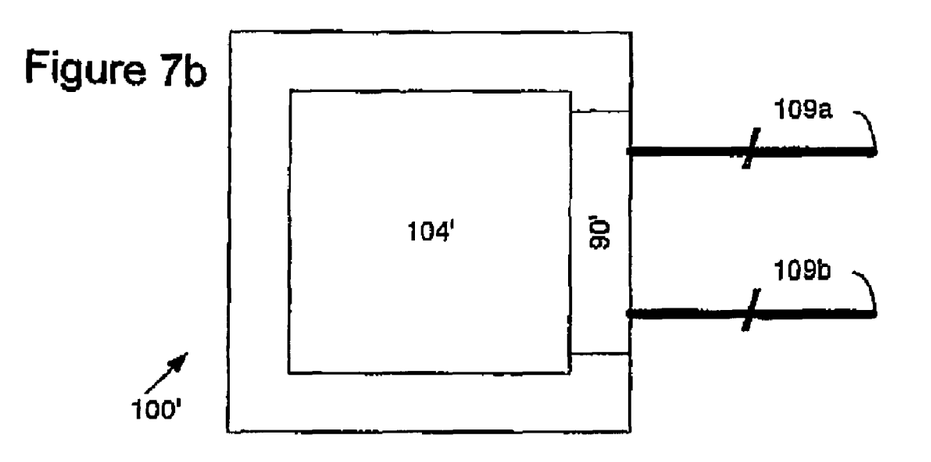

An embodiment of the present invention can be seen in FIGS. 7a and 7b, which shows a device 100' equipped with the innovation as it may be connected in two RapidIO networks. The improved port 90' connects immediately with a device core 104'; the core 104' comprises any RapidIO physical layer functions not comprised by improved port 90' as well as the functions of the transport layer and higher levels. In the first deployment, shown in FIG. 7a, the device 100' is connected to the network by a bus 108. As the improved port 90' is of the configurable type, bus 108 may be 8 or 16 bit. In the second deployment, shown in FIG. 7b, the device 100' is connected to the network by two 8 bit busses 109a and 109b. In order for the improved port 90' to be compatible with these two deployments, modifications, differing from port 90, are required.

Figure 8:
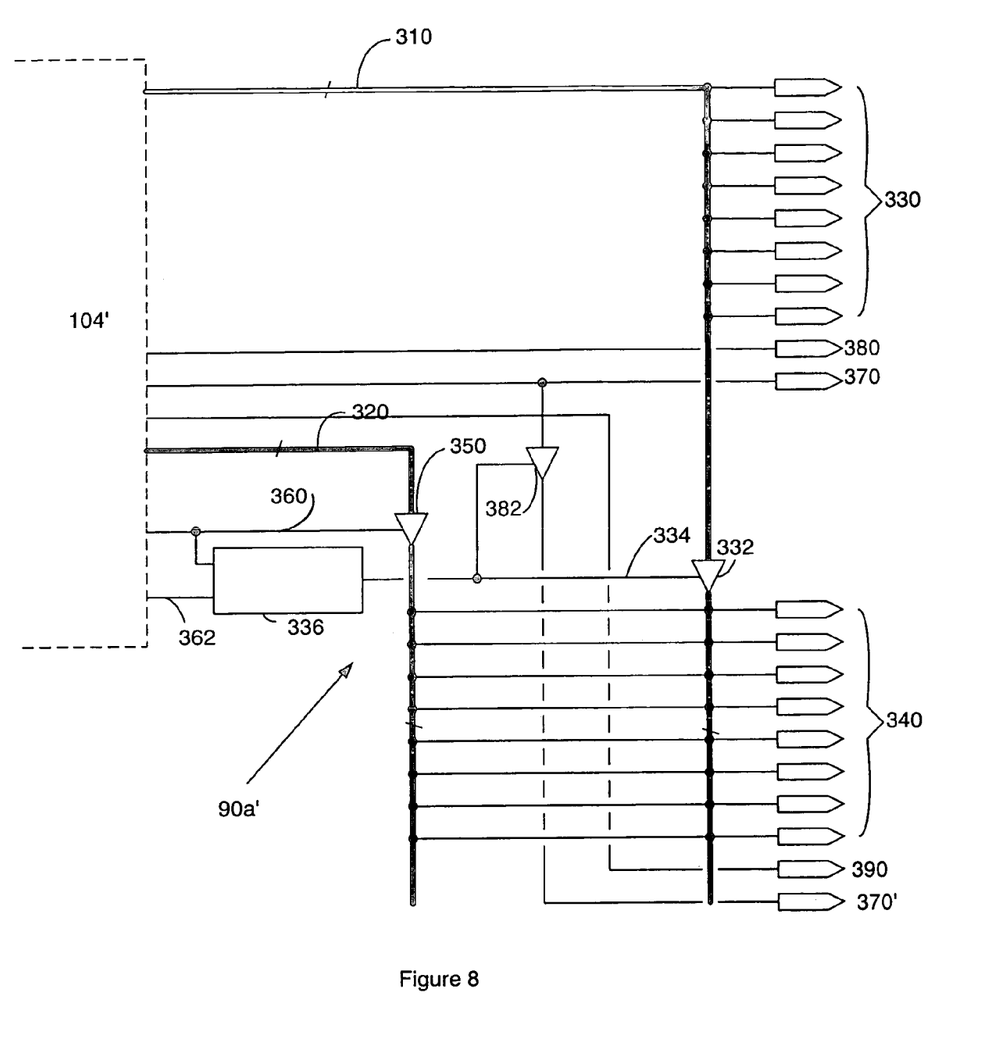
FIG. 8 is a schematic in detail of a transmission port capable of communication over one or two 8 bit busses or one 16 bit bus.
Figure 9:
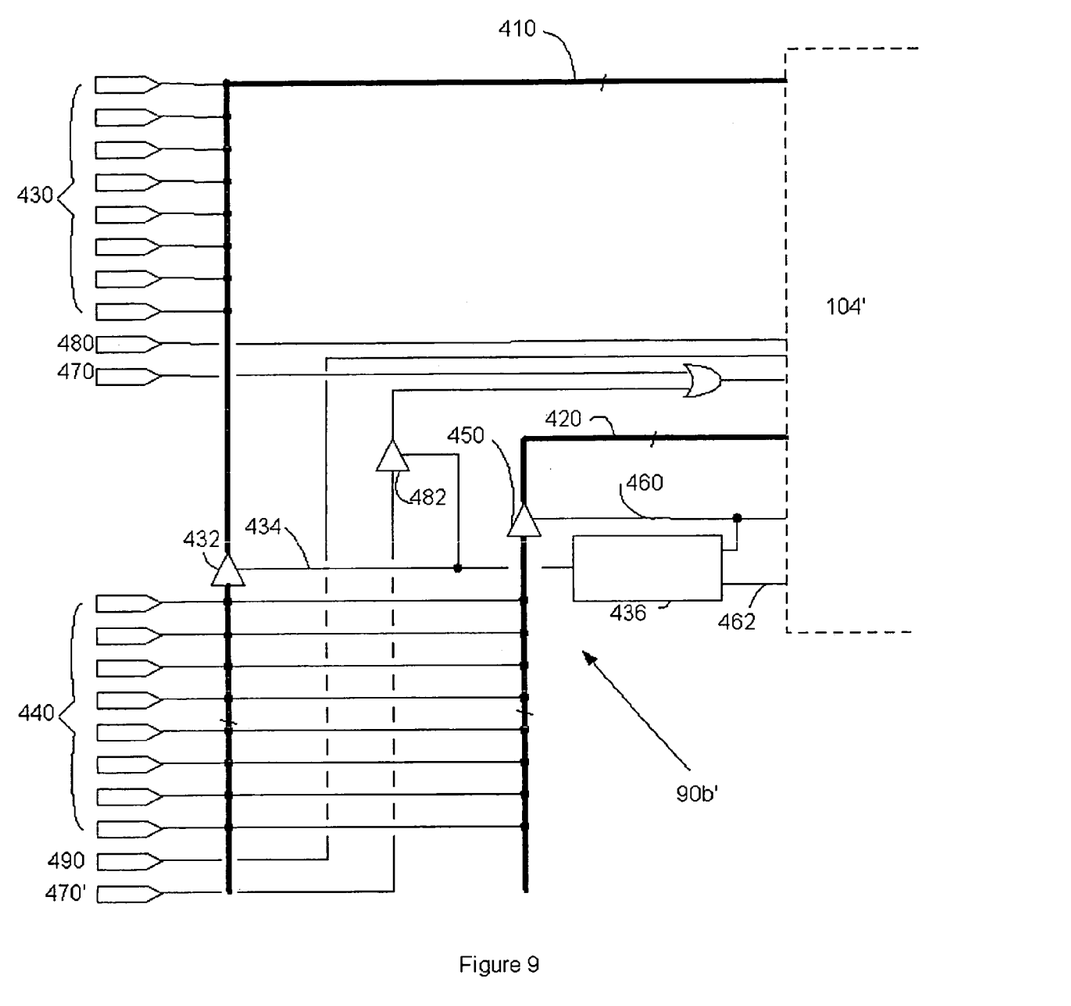
FIG. 9 is a schematic in detail of a reception port capable of communication over one or two 8 bit busses or one 16 bit bus.

FIGS. 8 and 9 detail the improved port 90' and it's immediate circumstances. Taking the half-ports 90a' and 90b' of FIGS. 8 and 9 together, we have the complete improved port 90'.

FIG. 8 shows a portion of the device 100' consisting of a transmission portion 90a' of the improved RapidIO transmission port 90' and the core 104'. Connected to the core 104' are two 8-bit busses 310 and 320. Bus 310 is directly connected to a LSB/8 bit output port 330 and coupled to a MSB port 340 by a buffer 332. Bus 320 is coupled to the MSB port 340 by a buffer 350, in turn coupled to the core 104' by a 16 bit mode enable signal path 360. Coupled directly from the core is a frame signal path 370, and two clock signal paths 380, 390. A duplicate frame signal path 370' is coupled to the frame signal path 370 by a buffer 382. Buffers 332 and 382 are coupled to a fault mode control 336 by a fault/8 signal path 334. The fault mode control 336 is coupled to the core by the 16 bit mode enable signal path 360 and by the fault signal path 362. Note that under the standard, there are two output ports for the clock signal, and each signal line is a low voltage differential pair.

In operation, bus 310 asserts a least significant portion of a 16 bit datum or the entirety of an 8 bit datum. Bus 320 asserts a most significant portion of a 16 bit datum. The frame signal exists to communicate the intervals of 32 bit datum corresponding to groups of 8 or 16 bit transmissions. The core controls the configuration of the half-port 90$a'$ via the 16 bit mode enable signal path 360 and the fault signal path 362. RapidIO busses may be connected to 90$a'$ in the following formats: one 8 bit bus to signals 330, 370, 380 or to 340, 370', 390; One 16 bit bus to signals 330, 340, 370, 380; or two 8 bit busses, one to 330, 370, 380, the other to 340, 370', 390. This last format is ideally suited for fault tolerant swapping between busses, as directed by core 104', and described herein below.

FIG. 9 shows a portion of the device 100' consisting of a reception portion 90$b'$ of the improved RapidIO transmission port 90' and the core 104'. Connected to the core 104' are two 8-bit busses 410 and 420. Bus 410 is directly connected to a LSB/8 bit output port 430 and coupled to a MSB port 440 by a buffer 432. Bus 420 is coupled to the MSB port 440 by a buffer 450, in turn coupled to the core 104' by a 16 bit mode enable signal path 460. Coupled directly from the core is a frame signal path 470, and a two clock signal paths 480, 490. A duplicate frame signal path 470' is coupled to the frame signal path 470 by a buffer 482. Buffers 432 and 482 are coupled to a fault mode control 436 by a fault/8 signal path 434. The fault mode control 436 is coupled to the core by the 16 bit mode enable signal path 460 and by the fault signal path 462. Note that under the standard, there are two output ports for the clock signal, and each signal line is a low voltage differential pair.

Bus 410 asserts a least significant portion of a 16 bit datum or the entirety of an 8 bit datum. Bus 420 asserts a most significant portion of a 16 bit datum. The frame signal exists to communicate the intervals of 32 bit datum corresponding to groups of 8 or 16 bit transmissions. The core controls the configuration of the half-port 90$b'$ via the 16 bit mode enable signal path 460 and the fault signal path 462. RapidIO busses may be connected to 90$b'$ in formats complementary to those of 90$a'$.

Taken together, port 90$a'$ and 90$b'$ form the complete port 90'. The port 90$^1$ is configurable via signals 360 and 460 as a 16 bit interface (bus 310 plus bus 320 for transmission/bus 410 plus bus 420 for reception). The port 90$^1$ is also configurable via signals carried on signal paths 160 and 260 as two different 8 bit interfaces. Signals carried on signal paths 362 and 462 determine whether such an interface is formed with bus 310 or 320 for transmission/bus 410 or 420 for reception). In a fault tolerant system, the port 90$^1$ provides for the necessity of rerouting (of 8 bit signals).

Figure 10:
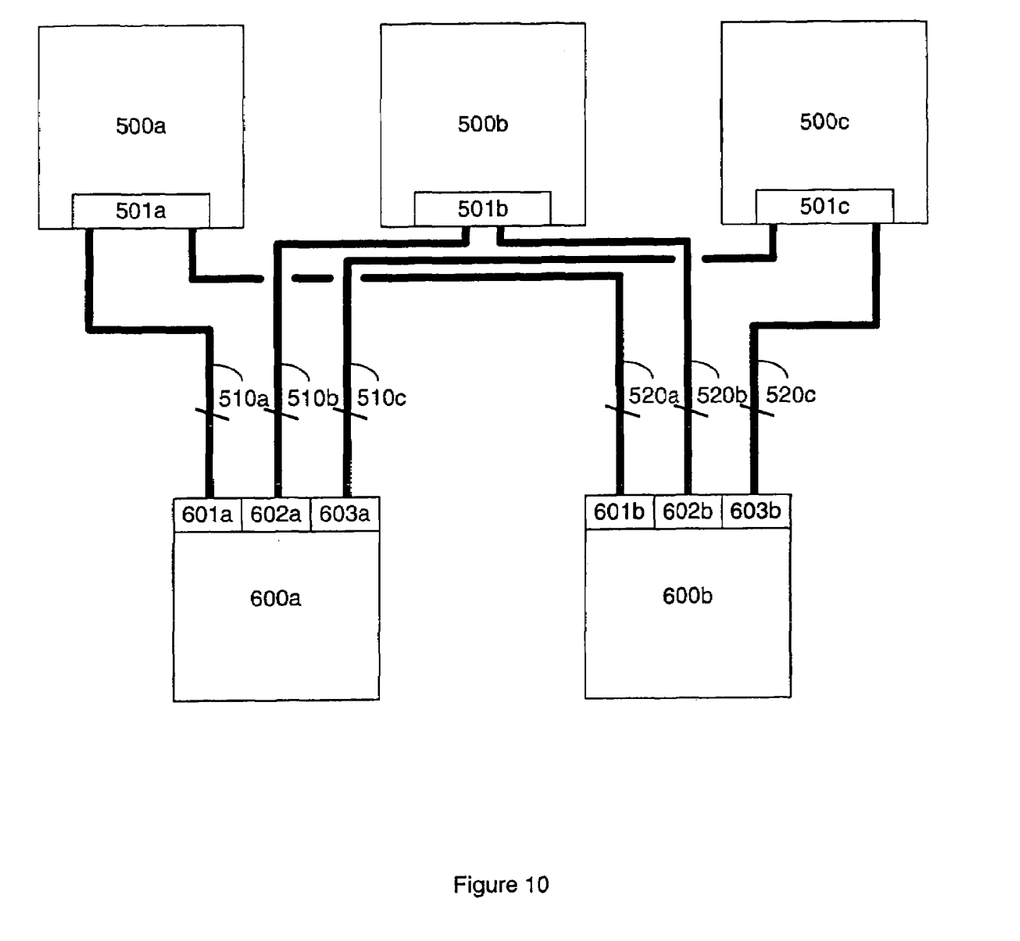
FIG. 10 is a schematic of a fault tolerant network incorporating an embodiment of the present invention.

FIG. 10 details a network of an embodiment of the present innovation. Three network endpoints, 500$a$, 500$b$, and 500$c$ are serviced by the network. These devices are of a class compliant with device 100' i.e. having an improved port 90' compliant port, 501$a$, 501$b$, and 501$c$ respectively. The network also includes two switches, 600$a$ and 600$b$. Each of these switches incorporates 3 ports, 601$a$, 602$a$, 603$a$, 601$b$, 602$b$, and 603$b$ respectively. Each endpoint 500$a$, 500$b$, 500$c$ is connected to the primary network switch 600$a$ by a RapidIO Bus, 510$a$, 510$b$, and 510$c$, respectively. This connection is made to the LSB of ports 501$a$, 501$b$, and 501$c$ respectively, and to 601$a$, 602$a$, 603$a$ respectively.

Each endpoint 500$a$, 500$b$, 500$c$ is connected to the replacement network switch 600$b$ by a RapidIO Bus, 520$a$, 520$b$, and 520$c$, respectively. This connection is made to the MSB of ports 501$a$, 501$b$, and 501$c$ respectively, and to 601$b$, 602$b$, 603$b$ respectively.

In the RapidIO system, IDLE communications are continuously transmitted in the absence of significant communications. This forms a discernable 'heartbeat'. When failure is detected, through the absence of the heartbeat, and provided any request for re-training fails, a fault tolerance routine may be executed.

For example, if switch 600$a$, or bus 510$a$ fails, switch 600$b$ is notified to ready for communication, the busses 520$a$, 520$b$, and 520$c$ are trained, data is recovered for packets lost in switch 600$a$ (RapidIO guarantees message delivery), and same switch is notified to terminate communication. Switch 600$b$ resumes the function of 600$a$. Note that the standby mode in which the switch 600$b$ is maintained (eg. Hot, Cold) is dependent on the actions and response implemented at a higher level of protocol.

It can be understood by one skilled in the art that the aforementioned RapidIO adaptations are equally applicable to HyperTransport™ or a similar standard, and the innovation is not derived from the standards but applicable to such.

For example, the mechanism described for overlaying this fault tolerance enhancement on the RapidIO standard is equally applicable to the HyperTransport™ interface.

In the case of a HyperTransport™ interface, there are several signals defined which are different from RapidIO. One skilled in the art could identify that these signals (e.g. CTL, PWROK, RESET#, LDTSTOP#, LDTREQ#) could be replicated in the same way as the FRAME signal in the above RapidIO examples. While these signals perform different functions than the FRAME signal of RapidIO, one skilled in the art can understand that the method for replicating these signals across several fault tolerant interfaces is the same as RapidIO. In the case of HyperTransport™, where there is a wider choice of data bus widths available the multiplicity of redundant interfaces could be correlated with the un-used data lines.

Having disclosed the aforementioned invention, we claim:

1. A port for connecting to a switching fabric, comprising:
   a plurality of signal resources dividable into at least a first resource subset and a second resource subset;
   a first bus having a first bus section connected to the first resource subset and a second bus section connected to the second resource subset;
   a second bus connected to the second bus section;
   a fault mode control operably coupled to the first bus and the second bus for selectively configuring the port as at least one of a first interface, a second interface and a third interface,
   said first interface incorporating said first resource subset,
   said first interface not incorporating said second resource subset,
   said second interface incorporating said first resource subset and said second resource subset,
   said third interface incorporating said second resource subset, and
   said third interface not incorporating said first resource subset.

2. The port of claim 1, for co-operating with a core, and further comprising a switching circuit, and wherein said switching circuit is controlled by the core and capable of coupling either said first, second, or third interface to said core.

3. A port as claimed in claim 1, where the switching fabric comprises a first fabric and a second fabric.

4. A port as claimed in claim 3, wherein the first fabric is a primary fabric.

5. A port as claimed in claim 4, wherein the second fabric is a replacement fabric for the replacement of the primary fabric.

6. A port as claimed in claim 5, wherein the replacement fabric comprises a cold standby fabric.

7. A port as claimed in claim 5, wherein the replacement fabric comprises a hot standby fabric.

8. A port as claimed in claim 1, wherein the port is compliant with a standard.

9. A port as claimed in claim 8, wherein the standard is RapidIO.

10. A port as claimed in claim 8, wherein the standard is Hpyertransport™.

11. A network comprising:
   a plurality of endpoints, each having the port of claim 1 and connected to a first external bus associated with the first resource subset and a second external bus associated with the second resource subset;
   a plurality of network switches including:
      a primary network switch connected to the first external bus for each endpoint, and
      a replacement network switch connected to the second external bus for each endpoint for the replacement of the primary network.

12. A method of configuring a port having a plurality of signal resources dividable into at least a first resource subset and a second resource subset, a first bus having a first bus section connected to the first resource subset and a second bus section connected to the second resource subset, and a second bus connected to the second bus section, the method comprising the steps of:
   operating on the first bus and the second bus to selectively configure the port as at least one of a first interface, a second interface and a third interface,
   said first interface incorporating said first resource subset,
   said first interface not incorporating said second resource subset,
   said second interface incorporating said first resource subset and said second resource subset,
   said third interface incorporating said second resource subset,
   said third interface not incorporating said first resource subset.

* * * * *